(12) United States Patent
Huang et al.

(10) Patent No.: US 10,160,172 B2
(45) Date of Patent: Dec. 25, 2018

(54) MECHANICAL INTERLOCKING REALIZED THROUGH INDUCTION HEATING FOR POLYMERIC COMPOSITE REPAIR

(71) Applicant: GM Global Technology Operations LLC, Detroit, MI (US)

(72) Inventors: Xiaosong Huang, Novi, MI (US); Chen-Shih Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 542 days.

(21) Appl. No.: 14/815,531

(22) Filed: Jul. 31, 2015

(65) Prior Publication Data

US 2016/0039157 A1 Feb. 11, 2016

Related U.S. Application Data

(60) Provisional application No. 62/033,721, filed on Aug. 6, 2014.

(51) Int. Cl.
*B32B 7/08* (2006.01)
*B29C 73/00* (2006.01)
(Continued)

(52) U.S. Cl.
CPC .......... *B29C 73/10* (2013.01); *B29C 35/0272* (2013.01); *B29C 35/0805* (2013.01);
(Continued)

(58) Field of Classification Search
CPC ......... B29C 65/02; B29C 65/04; B29C 65/34; B29C 65/36; B29C 65/3608;
(Continued)

(56) References Cited

U.S. PATENT DOCUMENTS 3,837,965 A 9/1974 Mahon et al.
4,409,270 A 10/1983 Faber et al.
(Continued)

FOREIGN PATENT DOCUMENTS

CN 102574329 A 7/2012
CN 105365232 A 3/2016
(Continued)

OTHER PUBLICATIONS

A First Office Action in German Application No. 102015112874.8 from the German Patent Office dated Sep. 8, 2016; 4 pages.
(Continued)

*Primary Examiner* — Philip C Tucker
*Assistant Examiner* — Brian R Slawski
(74) *Attorney, Agent, or Firm* — Harness, Dickey & Pierce, P.L.C.

(57) ABSTRACT

A method of repairing a polymeric composite workpiece. The method comprises identifying a localized area of the polymeric composite workpiece having a defect. A plurality of three dimensional interface structures are aligned adjacent at least a portion of the localized area. The method includes applying a polymeric composite patch to the localized area such that the interface structures are disposed between the polymeric composite workpiece and the polymeric composite patch. An alternating electromagnetic field may be introduced to selectively induce localized heating of the interface structures. The localized heating softens regions of the polymeric composite workpiece and the polymeric composite patch adjacent the interface structures, causing the interface structures to penetrate a distance into the respective polymeric composite workpiece and the polymeric composite patch.

16 Claims, 4 Drawing Sheets

(51) Int. Cl.

| | |
|---|---|
| *B32B 43/00* | (2006.01) |
| *B29C 65/00* | (2006.01) |
| *B32B 37/00* | (2006.01) |
| *B32B 38/04* | (2006.01) |
| *A61F 13/15* | (2006.01) |
| *C08J 5/00* | (2006.01) |
| *B29C 73/10* | (2006.01) |
| *B29C 65/04* | (2006.01) |
| *B29C 65/14* | (2006.01) |
| *B29C 73/34* | (2006.01) |
| *B29C 35/02* | (2006.01) |
| *B29C 35/08* | (2006.01) |
| *B29C 37/00* | (2006.01) |
| *B29C 65/36* | (2006.01) |
| *B29C 65/56* | (2006.01) |
| *B29K 101/12* | (2006.01) |
| *B29K 105/06* | (2006.01) |
| *B29K 705/00* | (2006.01) |
| *B29K 105/16* | (2006.01) |

(52) U.S. Cl.
CPC ......... *B29C 37/0082* (2013.01); *B29C 65/04* (2013.01); *B29C 65/1477* (2013.01); *B29C 65/3604* (2013.01); *B29C 65/3648* (2013.01); *B29C 65/3676* (2013.01); *B29C 65/3684* (2013.01); *B29C 65/564* (2013.01); *B29C 66/1122* (2013.01); *B29C 66/30341* (2013.01); *B29C 66/43* (2013.01); *B29C 66/472* (2013.01); *B29C 66/5326* (2013.01); *B29C 66/721* (2013.01); *B29C 73/34* (2013.01); *B29C 65/364* (2013.01); *B29C 65/3608* (2013.01); *B29C 65/3668* (2013.01); *B29C 66/73921* (2013.01); *B29C 66/81422* (2013.01); *B29C 2035/0811* (2013.01); *B29C 2035/0816* (2013.01); *B29C 2035/0861* (2013.01); *B29K 2101/12* (2013.01); *B29K 2105/06* (2013.01); *B29K 2105/167* (2013.01); *B29K 2705/00* (2013.01); *B29K 2995/0005* (2013.01)

(58) Field of Classification Search
CPC ............ B29C 65/3648; B29C 65/3676; B29C 65/3684; B29C 65/4815; B29C 65/487; B29C 65/489; B29C 66/71; B29C 66/1122; B29C 66/73921; C09J 5/06; B32B 37/06
USPC ...... 156/60, 91, 92, 94, 272.2, 272.4, 273.7, 156/275.5, 276, 308.2, 309.6, 379.6
See application file for complete search history.

(56) References Cited

U.S. PATENT DOCUMENTS

| | | | |
|---|---|---|---|
| 4,434,832 A | 3/1984 | Koch et al. | |
| 4,865,674 A * | 9/1989 | Durkin | B29C 37/0082 156/158 |
| 4,948,443 A | 8/1990 | Speer | |
| 5,024,818 A | 6/1991 | Tibbetts et al. | |
| 5,829,716 A * | 11/1998 | Kirkwood | B64C 1/065 244/117 R |
| 5,833,795 A * | 11/1998 | Smith | B29C 73/02 156/272.4 |
| 5,853,865 A | 12/1998 | McHugh et al. | |
| 6,200,686 B1 | 3/2001 | Ozaki et al. | |
| 6,781,099 B2 * | 8/2004 | Krah | B29C 65/342 219/544 |
| 6,843,945 B1 | 1/2005 | Lee et al. | |
| 6,872,294 B2 | 3/2005 | Lee et al. | |
| 6,875,471 B2 | 4/2005 | Lee et al. | |
| 6,911,169 B2 | 6/2005 | Kwag et al. | |
| 7,846,366 B2 | 12/2010 | Iobst et al. | |
| 7,981,501 B2 | 7/2011 | Kwag et al. | |
| 8,043,543 B2 | 10/2011 | Wang et al. | |
| 8,309,644 B1 | 11/2012 | Huang | |
| 8,449,810 B2 | 5/2013 | Rousseau | |
| 8,475,884 B2 | 7/2013 | Kia | |
| 8,486,321 B2 | 7/2013 | Kia | |
| 8,597,562 B2 | 12/2013 | Wang et al. | |
| 8,641,957 B2 | 2/2014 | Atkins et al. | |
| 8,668,247 B2 | 3/2014 | Kia et al. | |
| 8,814,255 B2 | 8/2014 | Yamaji et al. | |
| 8,840,827 B2 | 9/2014 | Iobst et al. | |
| 8,852,733 B2 | 10/2014 | Kwag et al. | |
| 8,882,183 B2 | 11/2014 | Suzuki et al. | |
| 8,946,342 B2 | 2/2015 | Konagai et al. | |
| 8,991,900 B2 | 3/2015 | Yamaji et al. | |
| 9,017,499 B2 | 4/2015 | Evens et al. | |
| 9,054,387 B2 | 6/2015 | Viavattine et al. | |
| 9,132,859 B2 | 9/2015 | Yamaji et al. | |
| 9,878,502 B2 | 1/2018 | Helfrich et al. | |
| 2006/0057335 A1 | 3/2006 | Wang et al. | |
| 2006/0148590 A1 * | 7/2006 | Sullivan | A63B 37/0003 473/371 |
| 2008/0128078 A1 | 6/2008 | May et al. | |
| 2010/0136866 A1 | 6/2010 | Kwag et al. | |
| 2012/0211144 A1 | 8/2012 | Litzenberger et al. | |
| 2012/0213997 A1 | 8/2012 | Wang et al. | |
| 2013/0089733 A1 | 4/2013 | Raghavan et al. | |
| 2013/0122262 A1 | 5/2013 | Nagakura et al. | |
| 2013/0149501 A1 * | 6/2013 | Pacchione | B29C 65/344 428/172 |
| 2013/0272780 A1 | 10/2013 | Takeuchi et al. | |
| 2013/0309001 A1 | 11/2013 | Teshima et al. | |
| 2013/0344282 A1 | 12/2013 | Yagi et al. | |
| 2014/0004308 A1 | 1/2014 | Taniguchi et al. | |
| 2014/0039114 A1 | 2/2014 | Hagihara et al. | |
| 2015/0001768 A1 | 1/2015 | Kia et al. | |
| 2015/0108793 A1 | 4/2015 | Peschansky et al. | |
| 2015/0328847 A1 | 11/2015 | Kia et al. | |
| 2017/0001389 A1 | 1/2017 | Engel et al. | |
| 2017/0203524 A1 | 7/2017 | Huang et al. | |
| 2017/0313002 A1 | 11/2017 | Huang et al. | |

FOREIGN PATENT DOCUMENTS

| | | | |
|---|---|---|---|
| CN | 106976256 A | 7/2017 | |
| CN | 107336449 A | 11/2017 | |
| DE | 4019744 A1 | 1/1992 | |
| DE | 102005011977 A1 | 2/2006 | |
| DE | 102007026099 A1 | 12/2008 | |
| DE | 102011014017 A1 | 9/2012 | |
| DE | 102011076463 A1 | 11/2012 | |
| DE | 102012207468 A1 | 11/2013 | |
| DE | 102013112933 A1 | 5/2015 | |
| DE | 102015112874 A1 | 2/2016 | |
| DE | 102015008312 A1 | 1/2017 | |
| DE | 102017100509 A1 | 7/2017 | |
| DE | 102017109362 A1 | 11/2017 | |
| EP | 1755871 A2 | 2/2007 | |
| FR | 2742691 A1 * | 6/1997 | ......... B29C 37/0085 |
| FR | 3050684 A1 | 11/2017 | |
| JP | S58191123 A | 11/1983 | |
| JP | S59223784 A | 12/1984 | |
| JP | 2000143743 A | 5/2000 | |
| JP | 3294808 B2 | 6/2002 | |
| JP | 2002294160 A | 10/2002 | |
| JP | 2009143985 A | 7/2009 | |
| JP | 2010137527 A | 6/2010 | |
| JP | 2013503763 A | 2/2013 | |
| JP | 2013525949 A | 6/2013 | |
| JP | 2017141437 A | 8/2017 | |
| JP | 2017206685 A | 11/2017 | |
| WO | WO-1994012338 A1 | 6/1994 | |
| WO | WO-2012102315 A1 | 8/2012 | |
| WO | WO-2012105080 A1 | 8/2012 | |
| WO | WO-2012105387 A1 | 8/2012 | |
| WO | WO-2012105389 A1 | 8/2012 | |

(56) References Cited

FOREIGN PATENT DOCUMENTS

| WO | WO-2012105716 A1 | 8/2012 |
| WO | WO-2012105717 A1 | 8/2012 |
| WO | WO-2012108446 A1 | 8/2012 |
| WO | WO-2012117593 A1 | 9/2012 |
| WO | WO-2012140793 A1 | 10/2012 |
| WO | WO-2013113676 A2 | 8/2013 |
| WO | WO-2015087905 A1 | 6/2015 |

OTHER PUBLICATIONS

Huang et al.; U.S. Appl. No. 15/144,625, filed May 2, 2016 entitled "Cosmetic Repair of a Thermoplastic Carbon Fiber Composite"; 44 pages.
Huang et al.; U.S. Appl. No. 15/624,240, filed Jun. 15, 2017 entitled "Heating Elements for Repair of Molding Defects for Carbon Fiber Thermoplastic Composites"; 46 pages.
A First Office Action in Chinese Application No. 201510601690.0 from the Chinese Patent Office dated Mar. 30, 2017; 17 pages.
He, Z., Satarkar, N., Xie, T., Cheng, Y.-T. and Hilt, J. Z.; "Remote Controlled Multishape Polymer Nanocomposites with Selective Radiofrequency Actuations"; Advanced Materials, 23; 2011; pp. 3192-3196.
First Office Action in German Application No. 102017109362.1 from the German Patent Office dated Mar. 22, 2018 and correspondence from Manitz, Finsterwald & Partner summarizing the First Office Action; 5 pages.
First Office Action in German Application No. 102017100509.9 from the German Patent Office dated Nov. 27, 2017; 5 pages.
Notification of Reasons for Refusal and First Search Report in Japanese Application No. 2017-003799 from the Japanese Patent Office dated Feb. 1, 2018; 15 pages.

\* cited by examiner

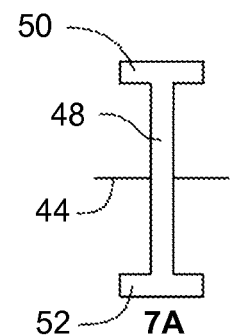
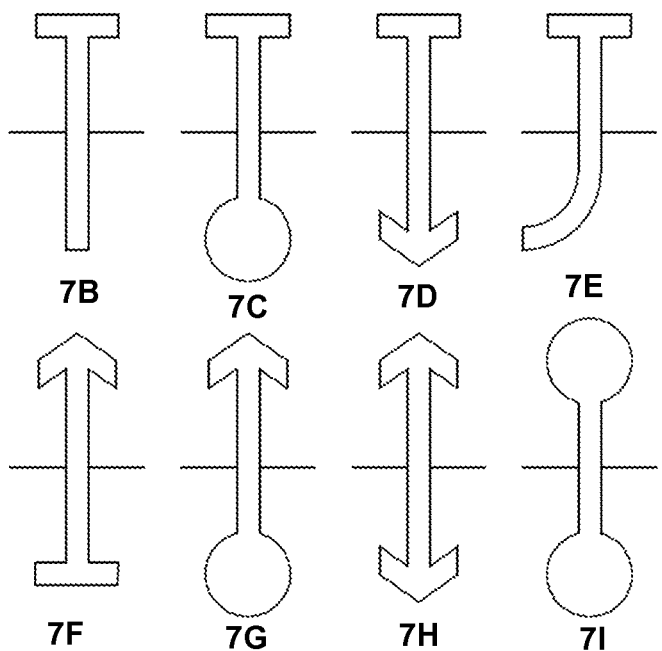
Figs. 7A–7I

MECHANICAL INTERLOCKING REALIZED THROUGH INDUCTION HEATING FOR POLYMERIC COMPOSITE REPAIR

CROSS REFERENCE TO RELATED APPLICATIONS

This application claims the benefit of U.S. Provisional Application No. 62/033,721, filed on Aug. 6, 2014. The entire disclosure of the application referenced above is incorporated herein by reference.

FIELD

The present disclosure relates to methods of repairing thermoplastic and polymeric composite parts using adhesion facilitators such as metal interface structures.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present technology.

The bodies of motor vehicles must manage the loads applied both during normal vehicle service and under extraordinary conditions such as a collision. Increasingly, vehicle bodies are constructed using materials such as polymeric or polymer-based composites that offer higher strength-to-weight ratios than the low strength, low carbon steel used in older designs. Polymeric composites in particular have been widely used in automobiles, and their utilization is expected to continue increasing in the future in an effort to further reduce the vehicle mass. Accordingly, the development of an effective repair method for impact damaged composite structures will remain important.

Automobile parts such as panels and bumpers made from polymeric composites are preferably designed to resist damage from low speed collisions, impacts from small stones or objects, and the weight of a leaning person. With higher energy impacts, however, various scuffs, dents, cracks, and other defects or damage can be formed in the panels and bumpers. Given certain part shapes, dimensions, or the assembly technologies, it is sometimes less expensive to replace a component than repair it. In most other circumstances, repairing a damaged component would be desirable. Accordingly, there remains a need for improved repair techniques for polymeric composites.

SUMMARY

This section provides a general summary of the disclosure, and is not a comprehensive disclosure of its full scope or all of its features.

In various aspects, the present teachings provide a method for repairing a polymeric composite workpiece. The method may include identifying a localized area of the polymeric composite workpiece having at least one defect. A plurality of three dimensional interface structures may be aligned adjacent a portion of the localized area. The method may include applying a polymeric composite patch to the localized area such that the interface structures are disposed between the polymeric composite workpiece and the polymeric composite patch. An alternating electromagnetic field may then be introduced adjacent the interface structures to selectively induce localized heating of the interface structures. The localized heating softens regions of the polymeric composite workpiece and the polymeric composite patch adjacent the interface structures, causing each interface structure to penetrate a distance into both the respective polymeric composite workpiece and the polymeric composite patch.

In other aspects, the present teachings provide a method of repairing a reinforced joint between two polymeric composite components. The method may include providing a first polymeric composite component having a first joint end and a second polymeric composite component having a second joint end. The first and second joint ends may be aligned, and the method may include arranging a plurality of three dimensional metal interface structures between the aligned joint ends. An alternating electromagnetic field may be introduced adjacent the interface structures to selectively induce localized heating of the interface structures, creating softened regions in the first and second polymeric components adjacent the interface structures. The method may include embedding at least a portion of each interface structure into respective softened regions of the first and second polymeric composite components to form a reinforced joint.

In still other aspects, the present teachings provide a method of increasing the strength of a polymeric composite joint in a vehicle body structure. The method may include aligning first and second polymeric composite panels that form the vehicle body structure. A substrate having a plurality of three dimensional metal interface structures may be provided between the first and second polymeric composite panels. The method may include selectively heating the interface structures by using electromagnetic induction techniques, and creating softened regions of the first and second composite panels adjacent the interface structures. At least a portion of the interface structures may then be embedded to into respective softened regions of both the first and second polymeric composite panels.

Further areas of applicability and various methods will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIGS. 7A-7I illustrate a plurality of interface structures having different exemplary geometries.

Figure 1A:
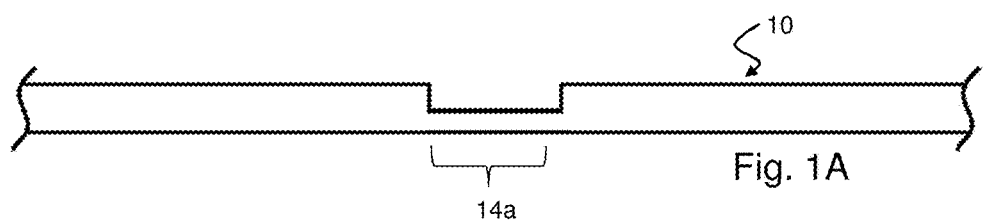
FIG. 1A illustrates a polymeric composite workpiece having a surface defect.

It should be noted that the figures set forth herein are intended to exemplify the general characteristics of materials, methods, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The following description is merely illustrative in nature and is in no way intended to limit the disclosure, its application, or uses. As used herein, the phrase at least one of A, B, and C should be construed to mean a logical (A or B or C), using a non-exclusive logical "or." It should be understood that steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Spatially relative terms, such as "inner," "outer," "beneath," "below," "lower," "above," "upper," "on," and their variants, may be used herein for ease of description to describe one element or feature's relationship to another element(s) or feature(s). Spatially relative terms may encompass different orientations of the device in use or operation. As used herein, when a coating, layer, or material is "applied onto," "applied over," "formed on," "deposited on," etc. another substrate or item, the added coating, layer, or material may be applied, formed, deposited on an entirety of the substrate or item, or on at least a portion of the substrate or item.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims.

Polymeric composite parts, such as components and workpieces for an automobile, can be damaged during normal use or as a result of collisions with foreign objects. The damage may be non-structural in nature (scuffs, dents, surface cracks, interface cracking, sub-interface cracking, debonding, delamination, etc.) or structural (deep or complete cracks through the component). In various aspects, it is desirable to have a reinforced joint between polymeric composite components or portions thereof that may be able to withstand significant bending or deformation of the workpiece. Depending on the type of damage or defect, a binder, such as a resin, can sometimes be used to repair at least a portion of the component or workpiece, for example, by filling in or covering the damage or defect. A binder or adhesive can be used to fill a defect, to attach a repair patch on the composite substrate, or to bond a new panel onto the structure when performing a replacement technique. In various aspects, the binder or adhesive alone may not provide the sufficient strength, especially in higher temperature environments.

The present disclosure generally relates to methods of repairing polymeric composite workpieces, body panels, and other parts with the assistance of what may be referred to as mechanical adhesion facilitators or adhesion promoters. As used herein, an adhesion facilitator or adhesion promoter may include a three dimensional interface structure capable of reinforcing a joint or bond between two polymeric composite components. In one example, the interface structures become physically interlocked with the polymeric composite components. As will be described below, in various aspects, methods of the present technology provide induction heating of metal or otherwise conductive interface structures placed between two polymeric composite panels. More particularly, the present technology relates to using induction heating in order to provide an electromagnetic field, such as an alternating electromagnetic field, that causes localized heating of the interface structures. The localized heating softens and/or melts portions of the polymeric composite material adjacent the interface structures while minimizing or without necessarily heating other areas of the polymeric composites. Once softened or melted, a portion of each interface structure may pierce through and become permanently embedded between adjacent polymeric composite panels, forming a reinforced mechanical joint.

As is known in the art, when an alternating electromagnetic field is introduced or applied using techniques such as induction heating, metallic or otherwise conductive materials/particles are observed to heat as a result of losses occurring due to the electronic or molecular movement and the magnetization. The conductive materials generate heat due to the induced eddy currents. The response of the conductive materials can uniformly heat a specific targeted polymeric composite area with minimal or no auxiliary heating of adjacent areas. This can significantly simplify and/or minimize the need and design of heating units that have commonly been used for various polymeric composite repair.

Figure 1B:
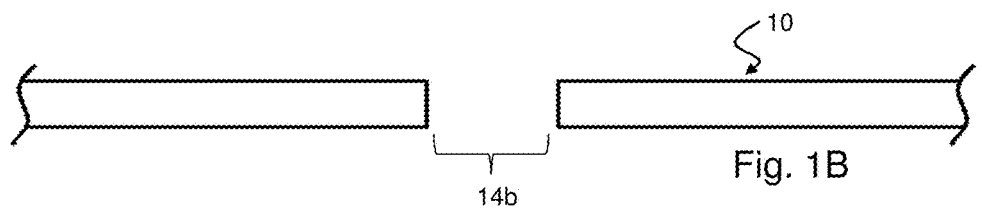
FIG. 1B illustrates a polymeric composite workpiece having a defect extending through the workpiece.

FIGS. 1A and 1B each illustrate a polymeric composite workpiece 10 having a defect that may be repaired using the techniques of the present disclosure. FIG. 1A illustrates a workpiece 10 having a surface defect 14a such as a scuff, dent, or surface crack. FIG. 1B illustrates a hole, structural crack, or structural defect 14b extending through the workpiece 10. Various methods may include detecting and identifying a localized area 12 (represented in FIG. 1C) of a polymeric composite workpiece 10 having one or more defect. In most instances, the defect 14a, 14b can be discovered with the naked eye or non-destructive evaluation techniques, such as vibrothermography, pulse thermography, phased array ultrasound, etc.

Figure 1C:
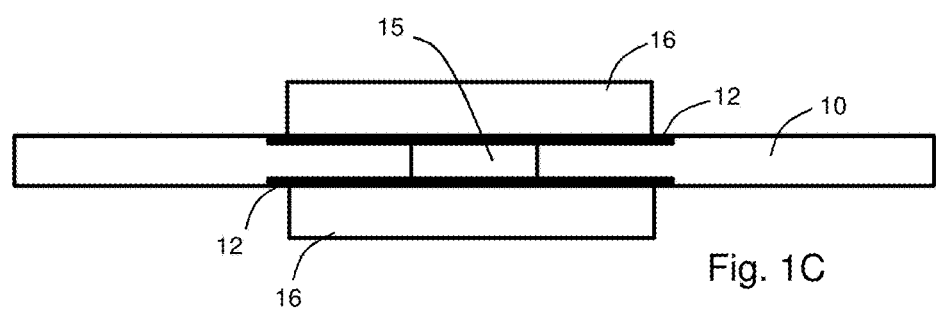
FIG. 1C illustrates the polymeric composite workpiece of FIG. 1B with the defect repaired using patching techniques of the present disclosure.

The defects 14a, 14b may, for example, have a depth of from about 0.1 mm to about 4 mm, or greater, depending on the thickness and end use of the workpiece 10. As shown in FIG. 1A, the defect 14a may include a surface dent or crack that does not extend substantially through an entirety of the workpiece 10. The particular polymeric composite workpiece 10 of FIGS. 1B and 1C may include what is referred to herein as a localized area 12 near the defect 14b and adjacent each of the front-facing and rear-facing major surfaces of the workpiece 10. As shown in FIG. 1C, the defect 14b may be partially or completely filled with a suitable binder, adhesive, or resin as designated by reference number 15.

The methods of the present disclosure provide aligning a plurality of three dimensional mechanical interlocking or interface structures 30 adjacent at least a portion of the localized area 12. One exemplary alignment can be seen in FIG. 4, which will be discussed below. In various aspects, the interface structures 30 may have a size and shape with a longest dimension ranging from about 100 μm to about 5 mm, keeping in consideration the fact that they will be used to help connect and reinforce two composite pieces.

The interface structures 30 may be conductive, and may include a conductive metal or conductive carbon material. In various aspects, the interface structures 30 may comprise stainless steel. The interface structures 30 may be ferromagnetic or comprise a ferromagnetic material. It is envisioned that any of the classes of ferromagnetic materials may be used, including without limitation: metals such as iron, nickel, or cobalt; alloys and compounds such as those based on neodymium, iron, samarium, and cobalt, as well as Alnico; and oxides including iron oxide and ferrites. Where it may be required to minimize any remnant magnetism, magnetically soft materials, such as substantially pure iron, iron oxide (hematite and magnetite), and soft ferrites such as, for example, manganese-zinc ferrite ($Mn_aZn_{(1-a)}Fe_2O_4$) or nickel-zinc ferrite ($Ni_aZn_{(1-a)}Fe_2O_4$) may be employed. Particles of magnetically soft materials may also be employed in combination with one another or other materials. In various aspects, the interface structure 30 may include nanoparticles exhibiting magnetic behavior. In presently preferred aspects, the magnetic particles or nanoparticles may include $Fe_3O_4$, FeCo, carbon nanotubes, and mixtures thereof. As used herein, the term nanoparticle may include both particles having an average particle size of about 250 nm or less, and particles having an average particle size of greater than about 250 nm to less than about 1 μm, sometimes referred in the art as "sub-micron sized" particles. The magnetic particles may be monodisperse, where all particles are of the same size with little variation, or polydisperse, where the particles have a range of sizes and are averaged.

After the plurality of three dimensional interface structures 30 are strategically applied and/or aligned, a polymeric composite patch 16 can be placed over at least a portion of the polymeric composite workpiece 10. In this regard, the interface structures 30 will be disposed between the polymeric composite patch 16 and the polymeric composite workpiece 10. In certain aspects, depending on the type of defect, it may be desirable to place a polymeric composite patch 16 on both opposing major surfaces of the polymeric composite workpiece 10, as shown in FIG. 1C.

The methods of the present disclosure provide for the introduction of an electromagnetic field, such as an alternating electromagnetic field, adjacent the localized areas 12 that include the interface structures 30 to selectively induce localized heating of the interface structures 30. The heating is applied with an intent to soften and/or melt regions of the polymeric composite patches 16 and the polymeric composite workpiece 10 adjacent the interface structures 30, including any optional resin 15 between the patch 16 and workpiece 10. The heating and an optional application of external pressure between the components during the step of introducing an alternating electromagnetic field enables and/or causes the interface structures 30 to penetrate a distance into both the respective polymeric composite patches 16 and the polymeric composite workpiece 10, as best shown in the magnified portion of FIG. 4, forming a mechanically interlocked and reinforced joint. In various aspects, the external pressure may be from about 0.01 kPa to about 10 MPa.

By way of example, induction heating of conductive or ferromagnetic materials can occur when these materials are exposed to an alternating electromagnetic field operating in the kilohertz to megahertz frequency range. As is known in the art, radiofrequency (RF) is a rate of oscillation in the range of from about 3 kHz to about 300 MHz, which corresponds to the frequency of radio waves, and the alternating currents that carry radio signals. By way of example, when using certain ferromagnetic particles, the radiofrequency electromagnetic field may be introduced having a frequency of from about 50 kHz to about 450 kHz, from about 250 kHz to about 300 kHz, or about 280 kHz. In other examples, when embedding certain nanotube particles into the interface structures 30, such as carbon nanotubes that may have subsequently been magnetized, the radiofrequency electromagnetic field may be introduced having a frequency of from about 1 MHz to about 20 MHz, from about 5 MHz to about 15 MHz, or about 13 MHz. The specific radiofrequency or ranges of radiofrequency necessary for the magnetic particles to induce heat may vary upon the composition, particle size, depth of material, etc. See, e.g., He, Z., Satarkar, N., Xie, T., Cheng, Y.-T. and Hilt, J. Z. (2011), *Remote Controlled Multishape Polymer Nanocomposites with Selective Radiofrequency Actuations.* Adv. Mater., 23: 3192-3196, the relevant portions of which are incorporated herein by reference. In various aspects, the electromagnetic field may be applied to the localized area and/or resin for a time period of from about 1 minute to about 45 minutes, from about 5 minutes to about 35 minutes, or from about 5 minutes to about 25 minutes. As should be understood, the time may vary depending on the resin composition and the particular magnetic particles selected for use. In certain aspects, the electromagnetic field may be applied for a time period sufficient to reach a certain temperature. For example, the electromagnetic field may be applied until the localized heating increases a temperature of the localized area to a range of from about 60° C. to about 250° C., from about 120° C. to about 240° C., or from about 150° C. to about 200° C.

In certain aspects, the methods may include applying one or more resin materials to the localized area 12 and optionally aligning the interface structures 30 in the resin. As should be understood, the resin composition and interface structure material varieties should be selected with the workpiece composition in mind. For example, where the polymeric composite workpiece comprises a thermoplastic material, it is beneficial to select a resin composition and interface structure material that will be heated to an appropriate temperature such that the region of the polymeric composite workpiece surrounding the defect attains a temperature suitable to soften or melt in order for the interface structure to appropriately pierce into the workpiece. In various aspects, the resin material can be the same material or have the same composition as the composite matrix of the workpiece 10 or repair panel 16.

In certain aspects where a resin is to be used, it may also be desirable to prepare the resin(s), preferably a thermoplastic, with optional materials such as a functional filler or other additional agents or additives. As referred to herein, a "functional filler" is a material that is operable to improve one or more properties of the composition. Such properties include one or more chemical or physical properties related to the formulation, function, or utility of the composition, such as physical characteristics, performance characteristics, applicability to specific end-use devices, applications, or environments, ease of manufacturing the composition, and ease of use or processing the composition after its manufacture. For example, stabilizers, wetting agents, rheology control agents, organic and inorganic fillers, dispersing agents, adhesives, adhesion promoters, curing accelerators, tackifiers, waxes, de-aerators, mixtures thereof, and the like as known to those skilled in the art of resin formulations may be included and are contemplated as within the scope of the present technology. While certain additives may be known to exist in the prior art, the amount used with the present technology should be controlled to avoid adverse effects on the workpiece.

Figure 2:
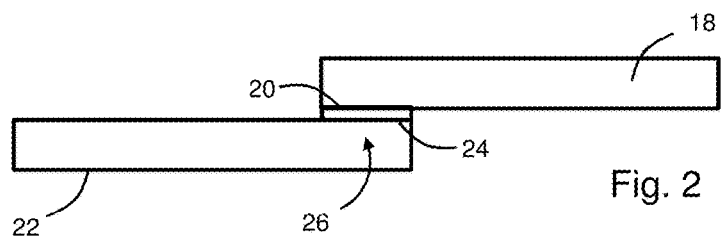
FIG. 2 illustrates two polymeric composite components mechanically interlocked with a reinforced joint using the techniques of the present disclosure.
Figure 3:
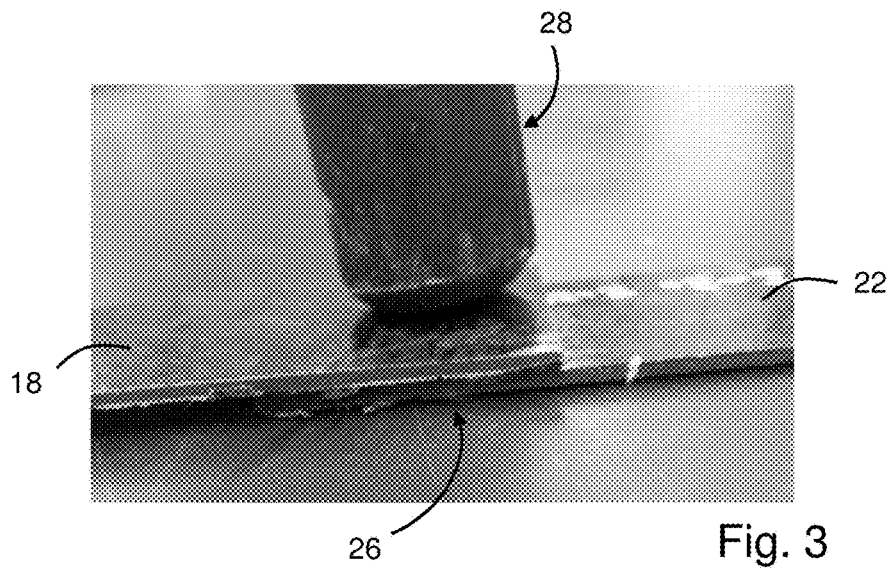
FIG. 3 illustrates an exemplary induction heater adjacent interface structures disposed between joint ends of two polymeric composite panels.
Figure 4:
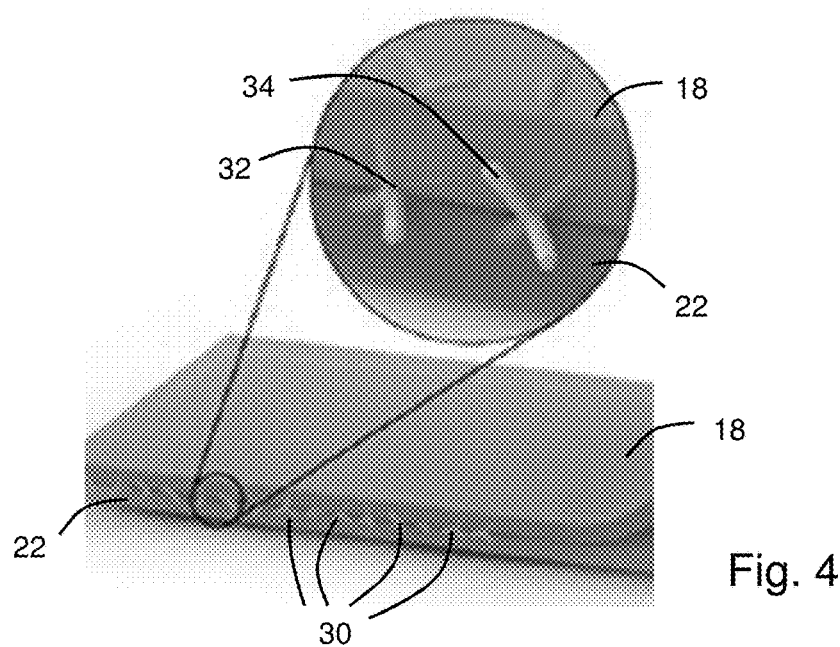
FIG. 4 illustrates a magnified portion of a localized area of a reinforced joint including a plurality of interface structures at least partially embedded within the polymeric composite components.

FIG. 2 illustrates two polymeric composite components mechanically interlocked with a reinforced joint using the techniques of the present disclosure. By way of example, if the damage on a workpiece, panel, or portion thereof is not repairable, the damaged panel or portion may need to be replaced. The newly replaced panel will need to have a good bond with the rest of the body structure, which can be achieved using the three dimensional interface structures 30. As shown, a first polymeric composite component 18 is provided with a first joint end 20, and a second polymeric component 22 is provided having a second joint end 24. The first and second joint ends 20, 24 are aligned and overlap at a region 26 that will be transformed into a reinforced joint. With reference to FIGS. 3 and 4, a plurality of interface structures 30 may be aligned between the first and second joint ends 20, 24, and an induction heating unit 28 may be provided to introduce an electromagnetic field, such as an alternating electromagnetic field, adjacent the interface structures 30. Similar to the repair technique discussed with respect to FIG. 1C, the electromagnetic field selectively induces localized heating of the interface structures 30, creating softened or melted regions in the joint ends 20, 24 of the first and second polymeric components 18, 22. With the optional application of external pressure or a compressive force between the aligned joint ends 20, 24, a portion of each interface structure 30 may then be embedded into the respective softened regions of both the first and second polymeric components 18, 22 to form a reinforced joint 26.

As shown in FIG. 4, the interface structures 30 may include or form a core region 32 having a plurality of leg extensions 34 extending therefrom. The leg extensions 34 may generally be spaced apart equidistant from one another, with certain leg extensions 34 embedded in the first polymeric composite component 18 and other leg extensions 34 embedded in the second polymeric composite component 22. In one non-limiting example, the interface structure 30 may be a conductive metal having a substantially tetrapodal shape. In other aspects, the interface structure 30 may have a profile with a cross-sectional area that defines a concave shape, or have at least one extension with a concave shape for purposes of locking into the polymeric composite components. As used herein, the term concave shape generally refers to a closed shaped polygon that is not convex, for example, having at least one interior angle that is greater than 180 degrees.

Figure 5:
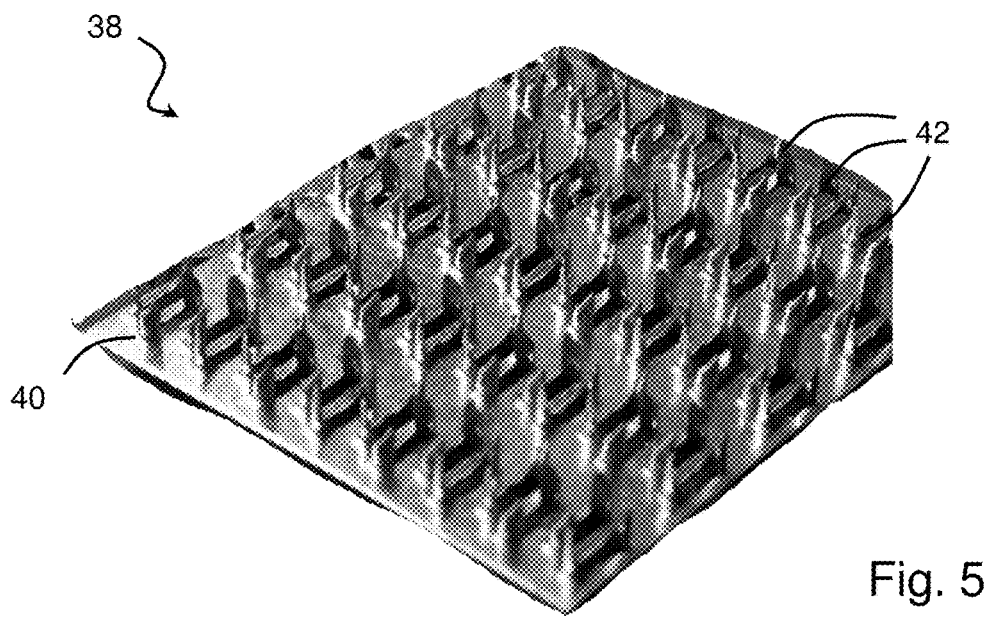
FIG. 5 illustrates an exemplary perforated metal plate connector defining a plurality of interface structures outwardly extending therefrom.

In addition to, or as an alternative to the use of individual interface structures, with reference to FIG. 5, the present technology also provides for the use of monolithic elements such as a perforated metal plate component 40 defining a plurality of interface structures 42 outwardly extending therefrom. In various aspects, the interface structures 42 may be integral with and stamped or carved out from the plate, extending in opposing directions from both major surfaces (only one major surface is shown).

Figure 6:
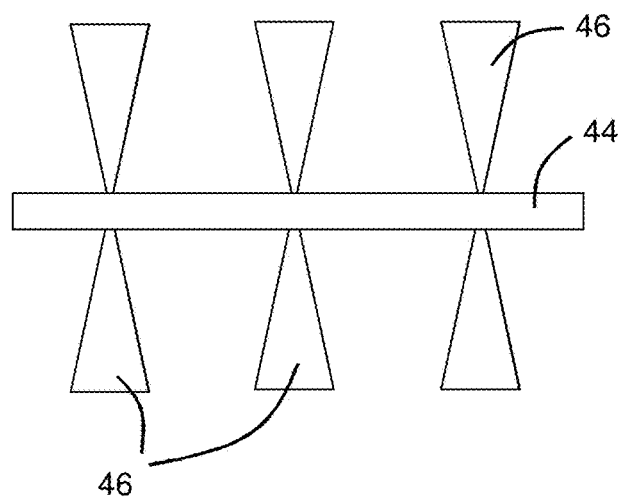
FIG. 6 illustrates a plurality of interface structures aligned and preassembled on a substrate.

In still other aspects, FIG. 6 illustrates a plurality of interface structures 46 aligned and preassembled on a substrate 44. By way of example, the substrate 44 may be in the form of a flexible polymeric membrane, a metal connecting plate, a metal mesh, a resin mesh, a resin film, or a fibrous veil material with the interface components 46 attached thereto. In certain aspects, the substrate 44 can include what are typically referred to as thermoplastic films or composite reinforcements, optionally including carbon or other reinforcing fibers, which may be pre-impregnated with resin or a similar compound. By way of example, the substrate 44 may be a thermoplastic resin in the form of a film. When subjected to the induction heating, the resin substrate 44 can behave as a hot melt adhesive, further reinforcing the joint between the composite materials. The thickness of the substrate 44 may vary depending on the size of the interface structures 30 and the desired flexibility.

FIGS. 7A-7I illustrate a plurality of interface structures having different geometries. Generally, each interface structure has a body portion 48 and two or more opposing end portions 50, 52 that may be provided with a variety of different shapes or curvatures useful in forming a reinforced joint connection. The interface structures are preferably monolithic components, but may be formed from separate pieces joined together.

It should be understood that the present technology is not dependent on, nor limited to, any particular type of material or production method, and the materials and methods may be varied as desired, based on the intended results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of repairing a polymeric composite workpiece, the method comprising:
   identifying a localized area of the polymeric composite workpiece having a defect;
   aligning a plurality of three dimensional interface structures having a tetrapodal shape to at least a portion of the localized area;
   applying a polymeric composite patch to the localized area such that the interface structures are disposed between the polymeric composite workpiece and the polymeric composite patch;

introducing an alternating electromagnetic field to selectively induce localized heating of the interface structures; and softening regions of the polymeric composite workpiece and the polymeric composite patch adjacent the interface structures, causing the interface structures to penetrate a distance into both the respective polymeric composite workpiece and the polymeric composite patch.

2. The method according to claim 1, wherein the interface structures comprise a conductive metal or conductive carbon material.

3. The method according to claim 2, wherein the interface structures comprise a magnetic material selected from the group consisting of $Fe_3O_4$, FeCo, carbon nanotubes, and mixtures thereof.

4. The method according to claim 1, wherein the plurality of interface structures are aligned and preassembled on a substrate.

5. The method according to claim 4, wherein the substrate comprises a flexible polymeric membrane.

6. The method according to claim 4, wherein the substrate comprises at least one of a metal connecting plate, a metal mesh, a prepreg material, a resin mesh, a resin film, and a fibrous veil material.

7. The method according to claim 1, comprising providing a perforated metal plate component that defines the plurality of interface structures outwardly extending from opposing major surfaces of the perforated metal plate component, wherein the step of aligning the plurality of three dimensional interface structures comprises aligning the perforated metal plate component with at least a portion of the localized area.

8. The method according to claim 1, further comprising applying a resin to the localized area and aligning the interface structures in the resin.

9. The method according to claim 1, further comprising applying pressure between the polymeric composite patch and the polymeric composite workpiece during the step of introducing the alternating electromagnetic field.

10. A method of preparing a reinforced joint between two polymeric composite components, the method comprising:

providing a first polymeric composite component having a first joint end and a second polymeric composite component having a second joint end;

aligning the first and second joint ends and arranging a plurality of individual three dimensional metal interface structures having a tetrapodal shape between the aligned joint ends;

introducing an electromagnetic field adjacent the interface structures to selectively induce localized heating of the interface structures, creating softened regions in the first and second polymeric composite components adjacent the interface structures; and embedding a portion of each interface structure into respective softened regions of both the first and second polymeric composite components to form a reinforced joint.

11. The method according to claim 10, wherein the metal interface structures comprise a plurality of leg extensions generally equidistant from one another.

12. The method according to claim 10, further comprising applying a resin between the aligned joint ends prior to arranging the plurality of three dimensional metal interface structures.

13. The method according to claim 10, wherein the step of embedding a portion of each interface structure into respective softened regions of both the first and second polymeric composite components comprises applying a compressive force between the aligned joint ends.

14. The method according to claim 10, comprising providing at least one perforated metal plate component that defines the plurality of metal interface structures outwardly extending from opposing major surfaces of the perforated metal plate component, wherein the step of aligning the plurality of three dimensional interface structures comprises aligning the perforated metal plate component between the first and second joint ends.

15. The method according to claim 10, wherein the interface structures comprise a concave shape.

16. A method of increasing the strength of a polymeric composite joint in a vehicle body structure, the method comprising:

aligning first and second polymeric composite panels that form the vehicle body structure;

providing a substrate comprising a plurality of three dimensional conductive interface structures having a tetrapodal shape between the first and second polymeric composite panels, wherein the substrate is a thermoplastic resin in the form of a film;

selectively heating the conductive interface structures by electromagnetic induction, creating softened regions in the first and second polymeric composite panels adjacent the conductive interface structures so that the substrate behaves as a hot melt adhesive; and embedding a portion of each conductive interface structure into respective softened regions of both the first and second polymeric composite panels.

* * * * *